(12) United States Patent
Reddy et al.

(10) Patent No.: US 9,288,231 B2
(45) Date of Patent: Mar. 15, 2016

(54) WEB CACHING WITH SECURITY AS A SERVICE

(71) Applicant: Cisco Technology, Inc., San Jose, CA (US)

(72) Inventors: Tirumaleswar Reddy, Bangalore (IN); Prashanth Patil, Bangalore (IN); Ramesh Nethi, Bangalore (IN); Daniel Wing, San Jose, CA (US); Christopher Wild, Boulder, CO (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 13/947,498

(22) Filed: Jul. 22, 2013

(65) Prior Publication Data

US 2015/0026757 A1 Jan. 22, 2015

(51) Int. Cl.
*H04L 29/06* (2006.01)

(52) U.S. Cl.
CPC ............. *H04L 63/20* (2013.01); *H04L 63/10* (2013.01); *H04L 63/0281* (2013.01)

(58) Field of Classification Search
None
See application file for complete search history.

(56) References Cited

U.S. PATENT DOCUMENTS

| | | | |
|---|---|---|---|
| 7,856,530 B1* | 12/2010 | Mu ............................... | 711/119 |
| 8,813,174 B1* | 8/2014 | Koeten .................. | H04L 41/022 |
| | | | 709/223 |
| 2007/0208946 A1* | 9/2007 | Baby et al. ..................... | 713/182 |
| 2010/0332401 A1* | 12/2010 | Prahlad ............... | G06F 17/3002 |
| | | | 705/80 |
| 2011/0119729 A1* | 5/2011 | Bergeson .............. | G06F 9/5061 |
| | | | 726/1 |
| 2012/0185913 A1* | 7/2012 | Martinez ................. | G06F 9/455 |
| | | | 726/1 |
| 2013/0219176 A1* | 8/2013 | Akella ................ | H04L 63/0815 |
| | | | 713/165 |

OTHER PUBLICATIONS

Blue Coat Adds Web Security to WAN Optimization for Re-Architecting Enterprise Wide Area Networks, Blue Coat Press Release, Nov. 8, 2011, Blue Coat Newsroom.
R. Fielding et al., Hypertext Transfer Protocol (HTTP/1.1): Caching, Oct. 4, 2012, HTTPbis Working Group.
SecaaS Implementation Guidance, Category 3: Web Security, Sep. 2012, Cloud Security Alliance.
European Search Report, from European Application No. 14178084, Dec. 10, 2014, EP.

* cited by examiner

*Primary Examiner* — Brandon Hoffman
(74) *Attorney, Agent, or Firm* — Lempia Summerfield Katz LLC (57) ABSTRACT

In one implementation, Web-Cache deployed in the Enterprise premises and cloud-based SecaaS are combined such that similar identity-based polices are enforced on both the SecaaS and content delivered from the Web-Cache. This identity-based policy implementation outside the network using SecaaS and within the network for web-cached content provides consistent identity-based security while still providing content to end-users with high performance. Content inspected and/or modified by SecaaS may be cached in the enterprise premises so that requests for content from an origin server decreases, freeing Internet bandwidth and reducing access time. Local caching of streaming content may decrease latency while local implementation of identity-based policy continues to limit the streamed content as appropriate. Local implementation of identity-based policy may reduce the load on SecaaS. Rather than using content delivery networks provided by a service provider for web-content, a cache server within the enterprise is used.

20 Claims, 4 Drawing Sheets

WEB CACHING WITH SECURITY AS A SERVICE

TECHNICAL FIELD

This disclosure relates in general to the field of computer networks and, more particularly, to web caching with cloud-based security as a service.

BACKGROUND

An enterprise network may cache web content. Web-caches augment the end-to-end transport of content by caching popular content. The content with the greatest demand is cached on servers within the network for serving the content to end-users with high availability and high performance. Enterprises deploy caching of web content to reduce bandwidth requirements, reduce server load, and improve the client response times for content stored in the cache.

As a security measure, the content is filtered. Enterprises deploy security appliances that perform application protocol detection/decryption, deep packet inspection, heuristics, and/or other functions within the network to detect malware, exploit scripts, prevent data leakage, or otherwise protect the network. These network based security processes may be applied to cached content. Another type of security for enterprise networks is cloud based "Security as a Service" (SecaaS). SecaaS provides scalable security. Using SecaaS, the enterprise benefits from market-leading web security to quickly and easily protect the network from web-based threats while saving bandwidth, money, and resources. However, SecaaS is provided outside the network, so identity-based security policies for cached content within the network may not be implemented.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS

Cached content is filtered by SecaaS. However, the identity of the requestor may change, so identity-based security is a gap in security for cached content. A cloud connector is able to fetch from web-cache or redirect traffic to SecaaS when content is not available in the cache. The cloud connector redirects HTTP traffic to the SecaaS for security. It also gleans user identity such that the SecaaS is able to provide identity-based security on the cloud. This implies that the cloud connector is unaware of policies on the cloud. On the other hand, with the presence of web-cache, cached content is obtained from the web-cache and not from the content server. The traffic is not redirected to the SecaaS.

Web-cache and SecaaS are combined such that similar identity-based polices are enforced on both the SecaaS and content delivered from the Web-cache. This identity-based policy implementation outside the enterprise network using SecaaS and within the network for web-cached content provides consistent identity-based security while still providing content to end-users with high performance. Content inspected and/or modified by SecaaS may be cached in the enterprise premises so that requests for content from an origin server decrease, freeing Internet bandwidth and reducing access time. Local caching of streaming content may decrease latency while local implementation of identity-based policy continues to limit the delivery of content as appropriate. Local implementation of identity-based policy may reduce the load on SecaaS. Even if CDN (Content Delivery Network) is provided by the Internet service provider (ISP), it will not be effective for the end-users attached to an Enterprise Network because the content request will be redirected to cloud-based SecaaS by the cloud connector. Hence, the Enterprise would want to deploy Web-Cache in the Enterprise itself.

In one aspect, a method is provided. A request from a user for content is intercepted at a cloud connector device of a network. When the content is not cached in the network, the request is redirected to a cloud-based security as a service by the cloud connector, the content is received from the cloud-based security as a service, and the content is routed to a cache server by the cloud connector. When the content is cached in the network, a processor determines whether the request satisfies an identity-based security policy. The request is sent to the cache server when the request satisfies the identity-based security policy, and the request is rejected when the request fails to satisfy the identity-based security policy.

In another aspect, logic is encoded in one or more non-transitory computer-readable media. The logic includes code for execution and when executed by a processor is operable to perform various operations. Identity-based security information is received within a network from a cloud-based security as a service outside the network. A request for content cached within the network is received from an identified source. The identity-based security information is used to verify that the identified source is allowed access to the content cached within the network. The content is provided to the identified source.

In yet another aspect, a client device connects to the enterprise network. The client device is configured to request content. A gateway device of the network is configured to restrict serving, in response to the request, of cached content within the network based on an identity-based security policy received from cloud-based security as a service.

In other aspects, a cloud-based security as a service receives a request for content from an enterprise network. The content is requested from a web server. The content is received from the web server in response to the request. The cloud-based security as a service filters the content received from the web server and adjusts a freshness setting of the content. The freshness setting corresponds to caching. The content with the adjusted freshness setting is transmitted to the enterprise network as a response to the request.

Web-caching within a network and SecaaS are married to provide security while still being able to provide content to end-users with high performance. A set of mechanisms ensures that the two solutions work as desired. To provide consistent security, the cloud connector implements the identity-based security policies. The cached content is already filtered by the SecaaS. Enterprises may enforce identity polices even for content retrieved from the web-cache. SecaaS optimizes the web cache solution by providing optimized lists of URLs that can be white-listed or black-listed for use by the cloud connector.

Figure 1:
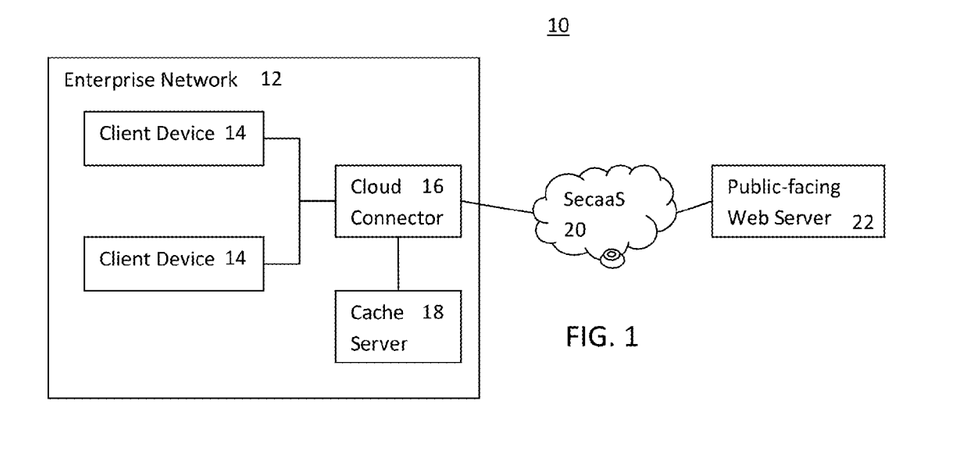
FIG. 1 is a simplified block diagram of an example network for web caching with security as a service.

FIG. 1 shows an example network 10 for web caching with cloud-based security as a service. The network 10 or a portion thereof is an apparatus for web caching with security as a service. Identity-based policy is implemented by SecaaS for non-cached content and implemented in the enterprise network 12 for cached content. The intent is that the same identity-based security policy is used for both types of content and/or locations.

The network 10 includes the enterprise network 12 connected to other servers and/or networks, such as the SecaaS network or server 20 and the public-facing web server 22. The enterprise network 12, SecaaS server 20, and web server 22 include various network devices, including one or more client devices 14, a gateway or cloud connector 16, a cache server 18, security as a service server 20, and the public-facing web server 22. The enterprise network 12 connects with or is part of a broader network 10. The web-caching with security as a service operates on the enterprise network 12 and/or the SecaaS server 20. The enterprise network 12 connects through wires or wirelessly with other networks, such as the Internet. The SecaaS server 20 and public-facing web servers 22 are part of or accessible through the other network or networks. The SecaaS server 20 is implemented by one or more servers outside of the enterprise network 12. Similarly, the web servers 22 are implemented by one or more servers outside of the enterprise network 12. Any now known or later developed SecaaS server 20 and/or web servers 22 may be used.

Additional, different, or fewer components may be provided. For example, additional client devices 14 are provided. As another example, additional cloud connectors 16 and/or cache servers 18 may be provided. Any number of servers for providing the security as a service, caching, and/or the web serving may be used.

The enterprise network 12 is shown as a box, but may be many different devices connected in a local area network, wide area network, intranet, virtual local area network, the Internet, or combinations of networks. Any form of network may be provided, such as transport networks, data center, or other wired or wireless network. The network 12 may be applicable across platforms, extensible, and/or adaptive to specific platform and/or technology requirements through link-negotiation of connectivity.

The network devices 14, 16, 18 of the enterprise network 12 are in a same room, building, facility or campus. In other embodiments, the enterprise network 12 is formed with devices distributed throughout a region, such as in multiple states and/or countries. The enterprise network 12 is a network owned, operated, and/or run by or for a given entity, such as the Cisco network for corporate operations.

The network devices are connected over links through ports. Any number of ports and links may be used. The ports and links may use the same or different media for communications. Wireless, wired, Ethernet, digital subscriber lines (DSL), telephone lines, T1 lines, T3 lines, satellite, fiber optics, cable and/or other links may be used. Corresponding interfaces are provided as the ports.

Any number of client devices 14 may be provided. The client devices 14 are computers, tablets, cellular phones, wifi capable devices, laptops, mainframes, or other user devices accessing content through the enterprise network 12. The client devices 14 connect to the enterprise network 12 through wires, such as Ethernet cables, or wirelessly, such as with wifi. The connection may be relatively fixed, such as for personal computers connected by wires to switches. The connection may be temporary, such as associated with mobile devices that access the enterprise network 12 as needed or when in range.

The client devices 14 are configured to request web-content. For example, a browser operating on one of the client devices 14 requests web content pursuant to TCP/IP. As another example, an application requests an update or other information pursuant to any standard for communications in the enterprise network 12.

The requested content is located on the web server 22. For more rapid response, the requested content may have been cached within the network. One or more cache servers 18 store previously requested and obtained content within the enterprise network 12. The cache server 18 may pre-fetch and store content expected to be requested.

The cache server 18 is a server, such as a server card and/or a database. Other network devices may be used, such as a router, gateway, or bridge. The cache server 18 is a processing device. Data is processed by the cache server 18, such as providing cached content in response to client requests and/or based on programming. The cache server 18 may be configured to obtain original content when the requested content is not stored and/or is expired.

Any content caching may be used. In one embodiment, the caching operation relies on header information provided with the content. The header may indicate a lifetime, freshness, or expiration appropriate for the content. For example, relatively static content may indicate allowable caching for hours or days. As long as the content was acquired within a cacheable period from a request, the cached content may be used. If the content is expired, the content is not served from the cache.

The cloud connector 16 is a gateway device of the enterprise network 12. The cloud connector 16 is a network interface card, an edge router, other router, a, firewall, or other network device. As a gateway device, the cloud connector 16 interfaces the enterprise network 12 with other networks, such as the SecaaS server 20 in the Internet. The cloud connector 16 is a processing device for communicating with the cache server 18, the client devices 14, and/or cloud-based SecaaS 20. Communications with other network devices may also be provided.

The cloud connector 16 is configured by software and/or hardware to implement identity-based policy for cached content. Serving of cached content within the network in response to a client request is restricted. The restriction is based on an identity-based security policy of the SecaaS 20. Consistent identify policy is enforced by the cloud connector 16 and the SecaaS server 20. In alternative embodiments, different identity-based policy may be used for cached verses non-cached content.

Other security filtering is provided by SecaaS server 20, even for cached content. Any cached content is received from SecaaS server 20, so has been security filtered prior to caching. Since the identity of the requestor of the cached content may be different than the identity of the original requestor, the identity-based security is implemented for each request.

The various components of the network 10 are configured by hardware and/or software to provide caching, SecaaS, serving content, or other operations. Logic is encoded in one or more non-transitory computer-readable media for operating the cloud connector 16, cache server 18, and/or the SecaaS server 20. The media is a memory. Memories within or outside the enterprise network 12 may be used. The logic includes code for execution by a processor or processors, such as processors of the cloud connector 16. When executed by a processor, the code is used to perform operations for caching, serving cached content, and identity-based security. The logic code configures the device to perform operations.

Figure 2:
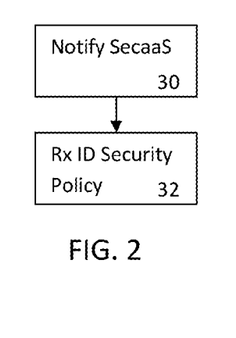
FIG. 2 is a flow chart diagram of one embodiment of a method for obtaining security information.
Figure 3:
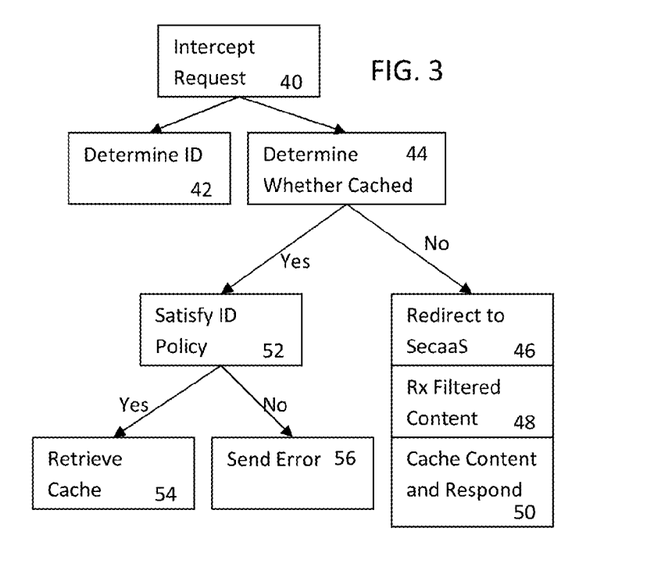
FIG. 3 is a flow chart diagram of one embodiment of a method for web caching with security as a service from the perspective of a cloud connector.

FIGS. 2 and 3 show embodiments of methods for web caching with cloud-based security as a service (SecaaS) from the perspective of the cloud connector 16. FIG. 2 is directed to initialization, updating, or periodic operation to obtain identity-based security policy. The operation occurs regardless of any client requests and/or is triggered as part of the process of responding to a request for content.

FIG. 3 is directed to responding to a request for content from a client within the network. The combination of web caching with cloud-based security as a service is implemented as a program, such as a program created with WebSocket. A protocol may be created to define operation or the program operates without a specific protocol definition.

Figure 5:
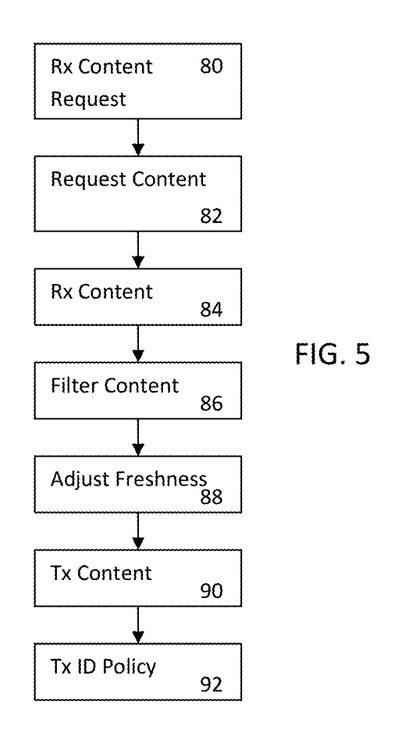
FIG. 5 is a flow chart diagram of one embodiment of a method for web caching with security as a service from the perspective of a security as a service server.

FIG. 5 is directed to operation of the SecaaS. SecaaS interacts with the enterprise network to provide security for content and/or to provide identity-based policy for implementing by the enterprise network.

The methods of FIGS. 2, 3, and 5 are implemented by the network of FIG. 1, by the cloud connector (FIG. 3), by the SecaaS server (FIG. 5), by other enterprise network devices, or by other networks or software. Any of various devices and corresponding applications may implement all or portions of the methods. Additional, different, or fewer acts may be provided. For example, the methods are directed to serving a given request. Some or all of the acts are repeated for other requests. The acts are performed in the order shown or a different order.

Referring to FIG. 2, the cloud-based security as a service is notified of web caching in the network in act 30. The network is to perform identity-based security on cached content. In order to provide consistent identity-based policy, the security as a service is notified for synchronizing the policies. The cloud connector 16 or other enterprise network device requests identify-based security policy or other information. Alternatively, different policies are implemented and the acts of FIG. 2 are not performed. In another alternative, the policy is provided in act 32 by pushing, so a notification or request from the network is not needed. In yet another alternative, an administrator assures through manual or semi-automated configuring that the same policies are implemented in both locations.

The notification occurs as an initial act upon establishing caching. Alternatively or additionally, the notification occurs periodically, such as to update the policy information. In other embodiments, the notification may occur in response to a trigger.

In act 32, identity-based security policy is received from SecaaS. In response to the request, the security policy associated with identities is provided from SecaaS. SecaaS is a centralized resource outside the enterprise network for security policies, so provides the policy to be used by the cloud connector 16. In other embodiments, the policy is provided from other sources, such as broadcast or distributed from within the network. The policy may originate in or outside the enterprise network.

The policy is related to security, such as limiting access. The limitation may be for threat or attack reasons or may be for other reasons. For example, content is limited for employees for an enterprise network, such as not allowing gambling related content. Guests may be allowed gambling content. As another example, content associated with possible network threats is limited to only employees with training in dealing with such threats. The policy may be in the form of a rule statement, a list or lists, a link to a resource, or other indication of the policy.

In one embodiment, the identity-based security policy is provided as a list or lists, such as one or more white lists and one or more black lists. The white list indicates user-groups permitted access to types of content. The black list indicates user-groups not permitted access to types of content. Other factors may be used for inclusion or not in a given list, such as lists based on URL instead of type of content. Separate lists may be provided for different types of content and/or for specific content. Alternatively, the lists include indications of different groupings by different types of content. Any format and factors considered for allowing or not access to content by identity may be used. The security policies for the different identities are provided.

Any identity classification may be used. In one embodiment, the identities are of users. In the example above, the users are either guests or employees. Other groupings may be provided, such as contractors or not. Other identification may be used. For example, the location of the user is identification, such as users located in a public space verses users located in a private or restricted space. Another identification may be the type of client device. For example, content restrictions may be different for private verses public client devices. As another example, content restrictions may be different for cellular telephones or mobile devices than for personal computers or stationary devices. Combinations of these different types of identity-based groups may be provided.

Other information may be provided from SecaaS. For example, SecaaS provides content that is to be cached. As a result, SecaaS may log or record a list of cached information and the associated lifetime of the cached content. In other embodiments, the cloud connector and/or the cache server logs or records the list of cached content. The list may be by uniform resource locator (URL), but other identification may be used. In alternative embodiments, the SecaaS provides an indication of the types of content (e.g., cachable target URL) and corresponding lifetime to be used by type.

Figure 4:
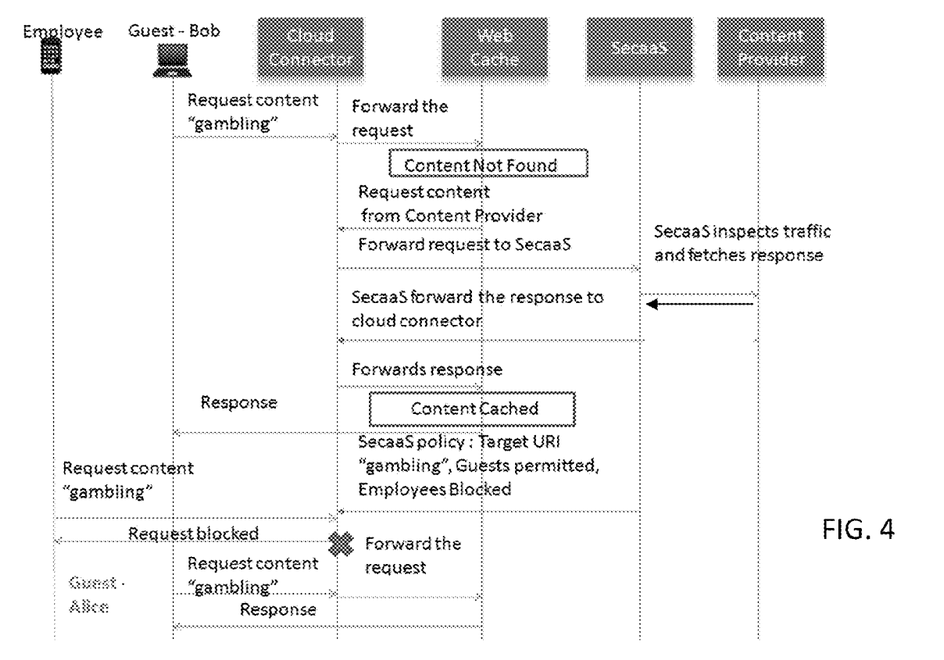
FIG. 4 is a communications diagram of an example of web caching with security as service.

Referring to FIG. 3, operation of the cloud connector 16 is shown. Other enterprise network devices may perform one or more of the acts, such as the cache server 18 performing a sub-set or all of the acts. The acts of FIG. 3 will be described herein with reference to the example of FIG. 4. FIG. 4 shows an example communications diagram including the communications and corresponding acts of the client, cloud connector, cache server, SecaaS, and content provider. Other examples are possible.

A client, such as the guest "bob" generates a request for content. In this example, the content is associated with or involves gambling. The request is provided to the cloud connector. The request is addressed to the content provider to serve the requested content.

In act 40, the cloud connector intercepts the request from the user. The request may not be addressed to the cloud connector, but the cloud connector is along the path of travel or route for the request, so examines the request. In other embodiments, the request is directed to the cloud connector, so the cloud connector intercepts by receiving. Since the request is for content not served by the cloud connector, the request is intercepted.

The cloud connector operates as a transparent proxy. Any requests for content are routed through the cloud connector, so all requests may be intercepted. Where multiple cloud connectors are provided, each given cloud connector intercepts all requests for content routed through or received at that given cloud connector. The transparent proxy allows the client devices, cache server, and SecaaS to operate as if the cloud connector where not part of the web caching and SecaaS operation with respect to any given request. The addressing and routing appropriate for requesting and responding to requests for content are the same as for caching and/or SecaaS.

The request is for content that is or is not cached. Some requests may be for cached content. Other requests may be for non-cached content. The client may not know whether or not the content is cached. The caching operations occur pursuant to any caching approach. The cloud connector reroutes the request for content from the web server outside the network to the cache server within the network for cached content and forwards requests to the web server for any content not cached. Alternatively, the cloud connector directs all requests to the cache server. The cache server either provides cached content or forwards the request back to the cloud connector for obtaining content from the web server.

In act 42, the identity of the source of the request is determined. The request is parsed. The header of the request includes identification information, such as the type of client device, the location of the device, the user associated with the device, log-in information, transport connection, or other identifying characteristics of the client, client device, or user. Connectors may use any of a variety of mechanisms to learn the user identity. Identity may be learned from a session directory, such as Active Directory/AAA server or via authentication mechanisms, such as Web authentication, NTLM, or Kerberos.

The source of the request (i.e., the client) is determined for the request. The information from the request itself is used as the identification. In other embodiments, information from the request is used to determine further identity information. For example, an indication of a client device address is used to look-up the current user logged-in to that device or the current type of connection or location of the device. The look-up may be through a request to another device, a request to the client device, and/or a local look-up by the cloud connector. Any identity determination or processes used for SecaaS or other policy implementation may be used.

The request for cached or non-cached content is received from an identified source. The identification is used for identity-based security policy by the cloud connector for cached content and by SecaaS for non-cached content.

In act 44, the cloud connector determines whether the requested content is cached within the network. For example and as shown in FIG. 4, the cloud connector forwards the request to the cache server. The caching implementation may seek the content from the cache first. If the cache server responds that the content is not cached, the cloud connector determines no caching. If the cache server responds with cached content, the cloud connector determines caching. The cache server maintains a list of uniform resource locators for cached content. Alternatively, the cloud connector maintains the list and determines without forwarding to the cache server.

In other embodiments, the determination of whether the identity-based policy is violated by the content sought by the request in act 52 is performed without or prior to determination of whether the content is cached. The cloud connector may perform the identity-based policy verification regardless of whether or not the content is cached, avoiding SecaaS having to perform identity-based verification.

Acts 46, 48, and 50 correspond to actions taken when the content is not cached in the network. When the end user or client requests content from the cache server, the cloud connector is already aware that the content is not available in the cache using a list (e.g., a cachable target URI and the targets lifetime for the content accessed from this site—labeled WCache) and forwards the request to the cache server. In one implementation of caching, the cache server is configured to request un-cached content from the content provider.

In act 46, the cloud connector redirects the request to the content provider to the cloud-based security as a service. Since new content is being sought, the content is to be routed through and processed by the security as a service. The addressing is altered so that the security as a service outside the network receives the request. The process is performed for any request associated with un-cached content. The cloud connector re-directs traffic for the original content provider to SecaaS. SecaaS enforces the web filtering policy, so the request is routed to SecaaS so that the responsive content also passes through SecaaS for filtering.

Referring to FIG. 4, the SecaaS receives the request for content. SecaaS inspects the request or traffic and fetches a response. The inspection is of the URL to make sure the URL satisfies security policy. This may be identity-based, content-based, and/or other policy. If satisfying, the content is received from the content provider in response to the request.

SecaaS filters any received content. Any policy may be used. For example, the content may be examined for an amount of "pink" or flesh tones. As another example, word searching may be performed to identify particular words or word strings that are not to be allowed. Secaas subjects the traffic to deep packet inspection, behavioral analysis, heuristics, application Identification or other process. Any SecaaS process may be used.

In other embodiments, the content is provided to the cloud connector without specifically routing through SecaaS for the responsive content. The content and/or identity policies are implemented by SecaaS by inspecting the request and corresponding URL rather than the responsive content itself.

In act 48, the content is received from the SecaaS server and/or the web server. The content is received in response to the request for content that was not cached. During operation of the enterprise network, many such responses and corresponding content may be received in response to corresponding requests.

The content that is received is secure. The filtering and policies implemented by SecaaS are satisfied since SecaaS is included within the request-response loop. The content is received, if satisfying the SecaaS policies, after filtering by the SecaaS server. SecaaS enforces the identity-based web filtering policy.

The response is sent from SecaaS through the cloud connector to the cache server. Implementing cache, non-cached content is provided to the cache server in addition to or as part of providing the content to the client.

For caching, one or more settings or parameters are included in the content. The content provider indicates whether the content may be cached and for how long. For example, a lifetime or freshness setting is included with the content. Validity and invalidity settings may be used. Any caching settings may be provided.

The SecaaS may alter one or more values of the caching settings. For example, the lifetime is altered. The content received by the cloud connector from the SecaaS has altered cache settings. In another embodiment, the content is received from the content provider and the cloud connector alters the cache settings pursuant to a policy provided from SecaaS. The caching header includes different values than provided by the content provider. The lifetime of the content is typically indicated by the web server from which the content is originally obtained. The lifetime may be altered. For example, the SecaaS may adjust the lifetime to be different. The lifetime is increased or decreased. Since SecaaS has been informed that the enterprise network is using web cache, SecaaS knows to modify the response to influence the caching of the content. Alternatively, SecaaS modifies regardless of knowing whether or not caching is performed.

The lifetime may be modified for any purpose. For example, SecaaS changes the Expires header to influence the time content is to be cached and/or changes the cache-control header appropriately so that content can be cachable or not. Where the content may be unknown to SecaaS or incomplete heuristics are available, the cache control may be set to prevent any caching in order to gather heuristics. As another example, the expiration may be decreased so that the cache expires earlier where the content may be at risk of including undesired content. If the fetched content does not have a reputation score and is subjected to test in Honey-pot to monitor the activates of the fetched content (both at the OS level and in the virtual network to detect any malicious content), the cloud-based SecaaS changes the headers in the HTTP response to indicate "no-store" so that web cache does not cache the content.

In act 50, the content is provided for caching in the network. The content is routed to the cache server. Based on the caching headers, the cache server caches or not. The period for which the cache is valid is based on the lifetime setting. By routing the content to the cache server, the cache server may cache. The cache server, based on the HTTP headers in the response, caches the content.

The cache server, as part of caching operation, may also send the content to the client. In other embodiments, the cloud connector provides the content to both the cache server and the client. The cache server does not forward the content. In either approach, the client receives requested content as long as the content clears SecaaS.

The cached content is cleared by SecaaS as part of the process of obtaining the content from outside the enterprise network. All of the cached content is filtered by SecaaS prior to caching.

Additional content may be cached. For example, the cache implementation may predict the next content to be requested. The cache server pre-fetches or pre-requests the content likely to be requested by the client. This pre-fetch is re-directed by the cloud connector to SecaaS as any request for content from outside the enterprise network. As a result, the cache server only stores the content inspected by SecaaS.

The cloud connector and/or the cache server store a list of cachable target uniform resource locators. The list is of URLs of content that has been cached. This list is used to determine whether subsequently requested content is available from cache. The cache server serves client requests, and the cache is populated over time. Requests for content from origin servers may decrease, freeing Internet bandwidth.

Returning to act 44, the content may have been cached. The cached content is used to respond to the request. In the example of FIG. 4, the employee requests the gambling content. As discussed above for FIG. 2, at some earlier point (shown as after caching and before the guest request in FIG. 4), the identity-based policy is provided from SecaaS to the cloud connector. In this example, the identity-based policy is that employees are not allowed access to gambling content, but guests are allowed access. The policies appropriate for cached content may be provided with original content for caching associated with the type of content, or the comprehensive set of identity-based policies is provided.

If the requested content is previously cached and expired, then the process proceeds as discussed above for acts 46, 48, and 50. The request is provided to the cache server, which checks expiration. If the content is not fresh, the cache server, through the cloud connector, requests original content from the web server. This request is redirected through SecaaS.

If the requested content is cached and still fresh, the cached content may or may not be appropriate for a given client (e.g., person, device, location, connection type or other client identity). When the end user requests content, the cloud connector is already aware that the content is available in the cache server using a list (e.g., WCache) To enforce identity-based security policy, the cloud connector acts as SecaaS in the path between the client and the cache server. The cloud connector takes appropriate action based on the identity-based policies.

In act 52, the cloud connector determines whether the request for content satisfies the identity-based security policy. Other devices may make this determination, such as the cache server.

To determine satisfaction of the policy, the appropriate policy is identified. The type of content with or without other settings is used to select the policy. In the example of FIG. 4, the policy on gambling is selected. Different policies may be provided for different identity groupings, so more than one policy may be selected. Other criteria may be used for selecting one or more appropriate policies.

The selected identity-based policy or policies are used to verify that the identified source is allowed access to the cached content. The identity information appropriate for the selected policies is used to apply the security policies to the request. In the example of FIG. 4, the identity of the client is that the client is an employee on the network. Using the gambling policy, guests are allowed access to the gambling content but employees are not. The identity of the client and the type of content, with or without other settings, are compared to a white and/or black lists or tables to determine compliance. Where the lists are for specific situations, the appropriate lists are obtained and the identity is used to determine satisfaction or not. The cached content was previously filtered by SecaaS, so implementing the identity-based security by the cloud connector provides comprehensive security policy implementation.

Where the identity-based policy is provided from or the same as SecaaS, the satisfaction of the identity-based policy is the same for the cloud connector as for SecaaS. As a result, the security implementation is consistent between original and cached content even though the cached content is not re-routed outside the network to SecaaS.

In act 54, the content is served to the client where the request satisfies the identity-based security policy. If the "white-list SecaaS" policy rule matches, then the cloud connector sends the request to the cache server to serve the client request. The cache server replies with the content. The content is provided to the client. The provided content passes or does not pass through the cloud connector.

In act 56, the request does not satisfy the identity-based security policy. In the example of FIG. 4, the employee requests cached gambling content. The cloud connector and/or cache server determines that employees or the identity group is not allowed access to gambling content. For example, the request may be on a black list. The list for gambling content indicates that employees are not allowed access, so the cloud connector rejects the request. The client is sent an error or other response without the content.

If the identity, type of content, or other value does not fall within an available list or identity-based policy, then act 52 is non-determinative. Cached content is available, but it cannot be determined whether the request for content should be granted. The cloud connector may request a policy update in general or request a policy specific to the situation. This additional information may include a policy rule dealing with the situation (e.g., new user group permissions). The cloud connector may then allow retrieval of the cached content or deny as appropriate. Alternatively, the request is routed to SecaaS for handling as if acquiring original content.

FIG. 5 shows a method representing actions by SecaaS for the network of FIG. 1 or other network. While described below as actions of a given SecaaS server, the actions may be performed by distributed servers. Similarly, other SecaaS servers may repeat the actions for other requests.

In act 80, a request for content is received, such as the request discussed above for act 46. The security service processor, such as a server, receives the request for content from a network, such as the enterprise network.

In act 82, the content is requested from a web server. The security server alters the header so that the web server provides the content to the security server instead of the enterprise network or original client. The request is sent to the web server. In act 84, the web server responds, so the security server receives the content from the web server.

In act 86, the security server filters the content received from the web server. The filtering may be based on URL, content analysis, identity of requestor, and/or other information. The filtering implements policy of the SecaaS or as configured by or for the enterprise network. While shown as filtering after receiving content, some filtering may occur prior to requesting the content from the web server. For example, the URL-based filtering and/or identity-based filtering occur based on the request rather than the received content. The nature of the content is known from the request or previous mining. For example, the URL may be used to indicate the type of content. Using the type of content, the identity of the client is used to determine whether that type of content should be provided.

In optional act 88, the security server adjusts a freshness or other cache setting of the content. The web server provides the content with cache settings. The cache settings may be altered according to security policy. For example, the ability to cache or not is changed from allowing caching to not allowing caching, such as where heuristics are being gathered for SecaaS. As another example, the lifetime is shortened to assure freshness despite the original cache setting for the content. In another example, sufficient security information may not be available, so caching is changed to be more limited or not allowed.

In act 90, the content, after filtering, is transmitted as a response to the request from the client. The content may be the same as or altered from the content as received from the web server. The cache headers may be the same as or altered from the headers as received from the web server. The filtered content is transmitted to the enterprise network. In other examples, the content does not pass security policy, so an error message or other message is transmitted instead of the content.

In act 92, one or more identity-based security policies are transmitted to the enterprise network, such as to the cloud connector. Black lists, white lists, policies in the form of rules, code or other form, and/or other policy information are transmitted. Alternatively, one or more settings used to configure identity-based security policies are transmitted.

The transmission is in response to a notice from the enterprise network. The notice indicates that caching is being performed. In other embodiments, the transmission occurs in response to another trigger, such as the enterprise network indicating insufficient policies to determine whether to serve the cached information based on identity. Alternatively or additionally, the transmission is periodic.

Figure 6:
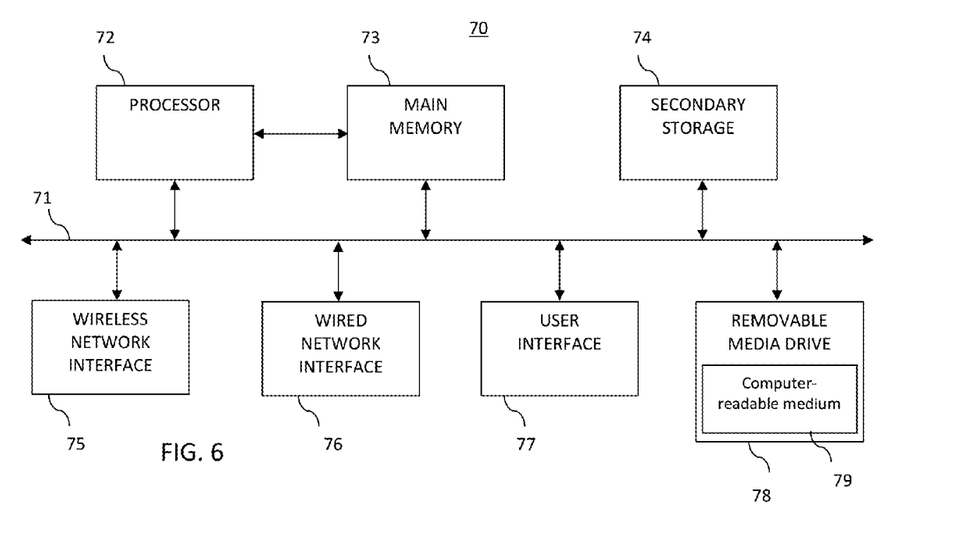
FIG. 6 is block diagram of a network device, according to one embodiment, for web caching with security as a service.

FIG. 6 is a simplified block diagram of an example network device, such as the client device 14, cloud connector 16, cache server 18 or SecaaS server 20 of FIG. 1. In FIG. 6, the example network apparatus or device 70 corresponds to network elements or computing devices that may be deployed in the network 12 or network 10. The network device 70 includes software and/or hardware to perform any one or more of the activities or operations for caching with security as a service.

The network device 70 includes a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the other components, memory, drives, and interfaces of network device 70.

Additional, different, or fewer components may be provided. The components are intended for illustrative purposes and are not meant to imply architectural limitations of network devices 12, 14. For example, the network device 70 may include another processor and/or not include the secondary storage 74 or removable media drive 78. Each network device 12, 14 may include more or less components than other network devices 14.

The processor 72, which may also be referred to as a central processing unit (CPU), is any general or special-purpose processor capable of executing machine readable instructions and performing operations on data as instructed by the machine readable instructions. The main memory 73 may be directly accessible to processor 72 for accessing machine instructions and may be in the form of random access memory (RAM) or any type of dynamic storage (e.g., dynamic random access memory (DRAM)). The secondary storage 74 may be any nonvolatile memory, such as a hard disk, which is capable of storing electronic data including executable software files. Externally stored electronic data may be provided to computer 70 through one or more removable media drives 78, which may be configured to receive any type of external media 79, such as compact discs (CDs), digital video discs (DVDs), flash drives, external hard drives, or any other external media.

The wireless and wired network interfaces 75 and 76 may be provided to enable electronic communication between the network device 70 and other network devices 12, 14 via one or more networks. In one example, the wireless network interface 75 includes a wireless network controller (WNIC) with suitable transmitting and receiving components, such as transceivers, for wirelessly communicating within the network 10. The wired network interface 76 may enable the network device 70 to physically connect to the network 10 by a wire, such as an Ethernet cable. Both wireless and wired network interfaces 75 and 76 may be configured to facilitate communications using suitable communication protocols, such as the Internet Protocol Suite (TCP/IP).

The network device 70 is shown with both wireless and wired network interfaces 75 and 76 for illustrative purposes only. While one or both wireless and hardwire interfaces may be provided in the network device 70, or externally connected to network device 70, only one connection option is needed to enable connection of network device 70 to the network 10. The network device 70 may include any number of ports using any type of connection option.

A user interface 77 may be provided in none, some or all machines to allow a user to interact with the network device 70. The user interface 77 includes a display device (e.g., plasma display panel (PDP), a liquid crystal display (LCD), or a cathode ray tube (CRT)). In addition, any appropriate input device may also be included, such as a keyboard, a touch screen, a mouse, a trackball, microphone (e.g., input for voice recognition), buttons, and/or touch pad.

Instructions embodying the activities or functions described herein may be stored on one or more external computer-readable media 79, in main memory 73, in the secondary storage 74, or in the cache memory of processor 72 of the network device 70. These memory elements of network device 70 are non-transitory computer-readable media. The logic for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. Thus, 'computer-readable medium' is meant to include any medium that is capable of storing instructions for execution by network device 70 that cause the machine to perform any one or more of the activities disclosed herein.

The instructions stored on the memory as logic may be executed by the processor 72. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

Additional hardware may be coupled to the processor 72 of the network device 70. For example, memory management units (MMU), additional symmetric multiprocessing (SMP) elements, physical memory, peripheral component interconnect (PCI) bus and corresponding bridges, or small computer system interface (SCSI)/integrated drive electronics (IDE) elements. The network device 70 may include any additional suitable hardware, software, components, modules, interfaces, or objects that facilitate operation. This may be inclusive of appropriate algorithms and communication protocols that allow for the effective protection and communication of data. Furthermore, any suitable operating system is configured in network device 70 to appropriately manage the operation of the hardware components therein.

One or more of the memories 73, 74, 79, or another memory stores the cached content, cache settings or headers, black lists, white lists, identity-based policies, error messages, requests, response, and/or source identity or identities. The processor 72 is configured to apply identity-based rules for serving cached information and redirect requests for original content. As the security server, the processor 72 may alter caching headers as part of security as a service.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
   intercepting, at a cloud connector device of a network, a request from a user for content;
   when the content is not cached in the network:
      redirecting the request to a cloud-based security as a service server;
      receiving the content from the cloud-based security as a service server;
      routing the content to a cache server; and
      receiving at a cloud connector identity-based security policy from the cloud-based security as a service server for the content;
   when the content is cached in the network:
      determining at the cloud connector device for the cached content whether the request satisfies an identity-based security policy that is a same policy as at the security as a service server;
      sending the request to the cache server when the request satisfies the identity-based security policy; and
      rejecting the request when the request fails to satisfy the identity-based security policy.

2. The method of claim 1 wherein intercepting comprises intercepting all requests, including the request, received at the cloud connector device and wherein all of the cached content, including the content routed to the cache server, is filtered by the cloud-based security as a service server prior to caching.

3. The method of claim 1 wherein intercepting at the cloud connector device of the network comprises intercepting with a transparent proxy at an edge router of an enterprise network.

4. The method of claim 1 further comprising storing a list of cachable target uniform resource locators, and determining whether the content is cached from the cachable target uniform resource locators.

5. The method of claim 1 wherein redirecting comprises redirecting to the security as a service server outside the network.

6. The method of claim 1 wherein receiving the content comprises receiving the content after filtering of the content by the cloud-based security as a service server.

7. The method of claim 1 wherein routing the content comprises routing the content to the cache server for caching and response, by the cache server, of the content to the request from a client other than the cache server.

8. The method of claim 1 further comprising notifying the security as a service server of web caching in the network, wherein receiving the content comprises receiving the content with an altered caching header as compared to the content as provided by a content server.

9. The method of claim 8 wherein the receiving the content with the altered caching header comprises receiving the content with an indication of no caching.

10. The method of claim 1 wherein determining whether the request satisfies the identity-based security policy comprises determining an identity of a source of the request by user, user group, device group, security clearance, location of the source, or combinations thereof.

11. The method of claim 1 further comprising receiving the identity-based security policy from the cloud-based security as a service server.

12. The method of claim 1 wherein determining whether the request satisfies the identify-based security policy comprises determining whether an identity of a source of the request is in a white list or a black list for the content.

13. The method of claim 12 wherein further comprising requesting a policy from the security as a service server where the identity is not in the white or black lists.

14. Logic encoded in one or more non-transitory computer-readable media that includes code for execution and when executed by a processor is operable to perform operations comprising:
- receiving, within a network, identity-based security information from a security as a service server outside the network;
- receiving, from an identified source, a request for content cached within the network;
- determining that the content is cached within the network, the cached content comprising content filtered by the cloud-based security as a service;
- verifying, with the identity-based security information, that the identified source is allowed access to the filtered content cached within the network; and
- providing the content to the identified source.

15. The logic encoded in the one or more non-transitory computer readable media of claim 14 wherein receiving the identity-based security information comprises receiving user identities, user-group identities, location identities, device identities, or combinations thereof and corresponding security policies implemented by the security as a servicer server, and wherein verifying comprises applying the security policies to the request for the cached content.

16. The logic encoded in the one or more non-transitory computer readable media of claim 14 further comprising:
- receiving a further request for content not cached in the network;
- redirecting the further request to the security as a service;
- receiving a response to the further request from the security as a service; and
- providing the response for caching in the network.

17. The logic encoded in the one or more non-transitory computer readable media of claim 16 wherein the response comprises further content responsive to the further request, the further content comprising security filtered content with a caching lifetime adjusted by the security as a service server.

18. An apparatus comprising:
- a client device connected to a network, the client device configured to request content; and
- a gateway device of the network, the gateway device configured to restrict serving, in response to the request, of cached content within the network based on an identity-based security policy received from a cloud-based security as a service.

19. The apparatus of claim 18 further comprising a cache server storing the cached content, a lifetime of the cached content set by the security as a service to be different than a setting of a source of the content.

20. A method comprising:
- receiving, at a security service processor, a request for content from a host in an enterprise network;
- requesting the content from a web server;
- receiving from the web server the content in response to the request;
- filtering, by the security service processor, the content received from the web server;
- adjusting a freshness setting of the content, the freshness setting corresponding to caching;
- transmitting the content with the adjusted freshness setting to the enterprise network as a response to the request; and
- transmitting an identity-based security policy to a cloud connector in the enterprise network for providing the content from cache within the network using the identity-based security policy.

* * * * *